(12) United States Patent
Wang

(10) Patent No.: US 12,451,249 B2
(45) Date of Patent: Oct. 21, 2025

(54) DYNAMIC HOME THEMES FOR ASSISTED EARLY DETECTION AND TREATMENT IN HEALTHCARE

(71) Applicant: AT&T Intellectual Property I, L.P., Atlanta, GA (US)

(72) Inventor: Wei Wang, Harrison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 511 days.

(21) Appl. No.: 17/588,624

(22) Filed: Jan. 31, 2022

(65) Prior Publication Data

US 2023/0245771 A1 Aug. 3, 2023

(51) Int. Cl.
*H04W 8/18* (2009.01)
*G16H 40/67* (2018.01)
*G16H 50/20* (2018.01)

(52) U.S. Cl.
CPC ............. *G16H 50/20* (2018.01); *G16H 40/67* (2018.01)

(58) Field of Classification Search
CPC .............................. G16H 50/20; G16H 40/67
See application file for complete search history.

(56) References Cited

U.S. PATENT DOCUMENTS

| 2016/0220821 A1* | 8/2016 | O'Connell | A61M 5/1723 |
| 2017/0143934 A1* | 5/2017 | Tsai | A61H 23/00 |
| 2022/0096857 A1* | 3/2022 | Prebeg | A61N 1/44 |

* cited by examiner

*Primary Examiner* — Reginald R Reyes
(74) *Attorney, Agent, or Firm* — Guntin & Gust, PLC; Louis Yang

(57) ABSTRACT

Aspects of the subject disclosure may include, for example, obtaining sensor data from a group of sensors arranged within an environment, the sensor data including observations of an individual. The sensor data is analyzed to obtain an analysis result and a condition of the individual is detected according to the analysis result. A treatment is associated with the condition and an environmental theme applied to the environment according to the treatment. Other embodiments are disclosed.

20 Claims, 12 Drawing Sheets

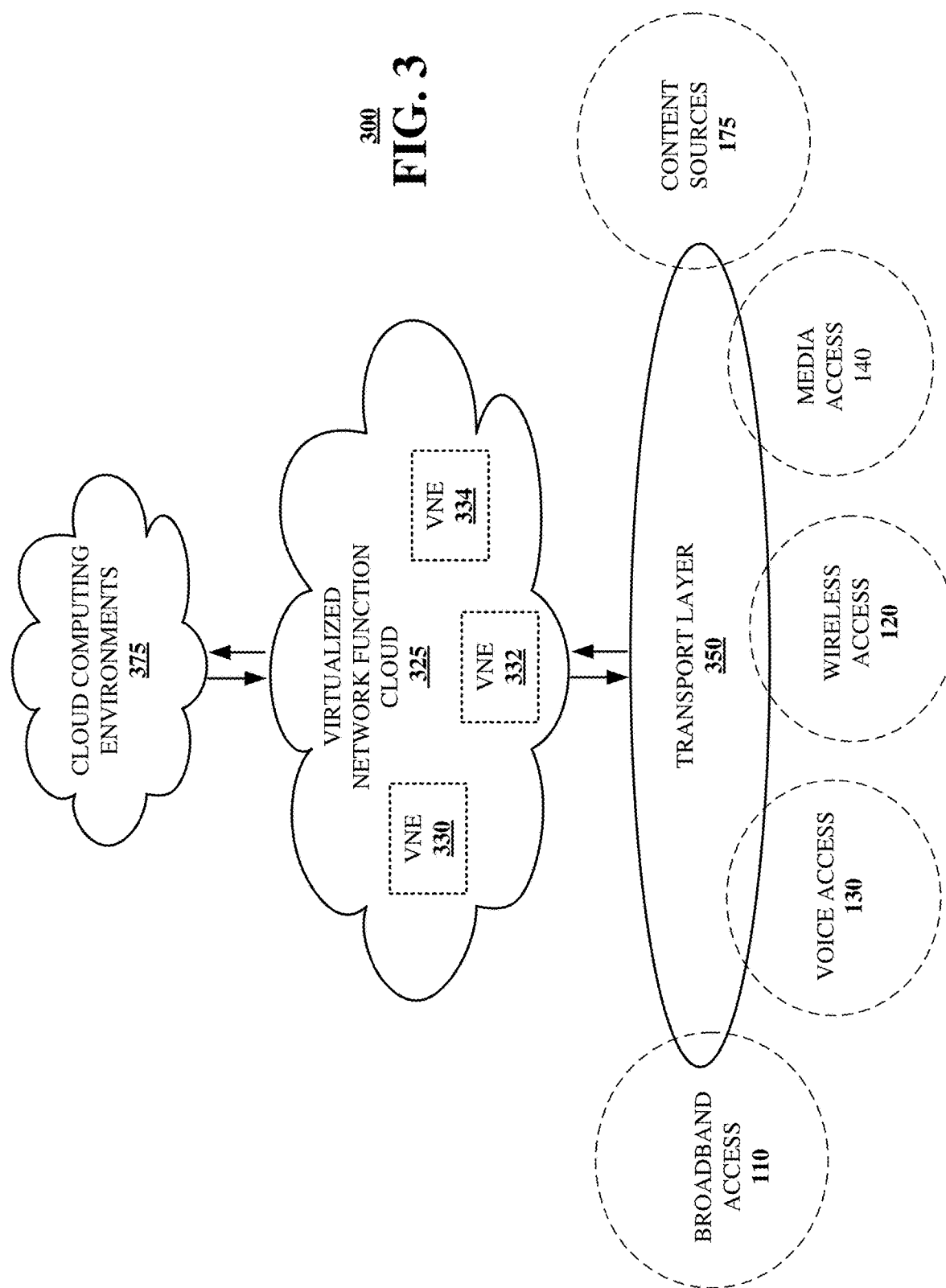

DYNAMIC HOME THEMES FOR ASSISTED EARLY DETECTION AND TREATMENT IN HEALTHCARE

FIELD OF THE DISCLOSURE

The subject disclosure relates to dynamic home themes for assisted early detection and treatment in healthcare.

BACKGROUND

The population of certain long-term disorders, such as depression and dementia, is growing. These disorders, unlike cancers, often times have clear symptoms even at an early stage of a disorder. Unfortunately, not everyone has access to the types of resources needed for early detection and prevention. In many if not most instances, there is a lack of proper resources, e.g., a lack of trained health-care providers, which may result in inaccurate assessments. Even though modern technologies have been developed much in recent years, such as image processing in cancer diagnosis, these technologies still heavily focus on reducing human errors and patients monitoring in the public health system.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
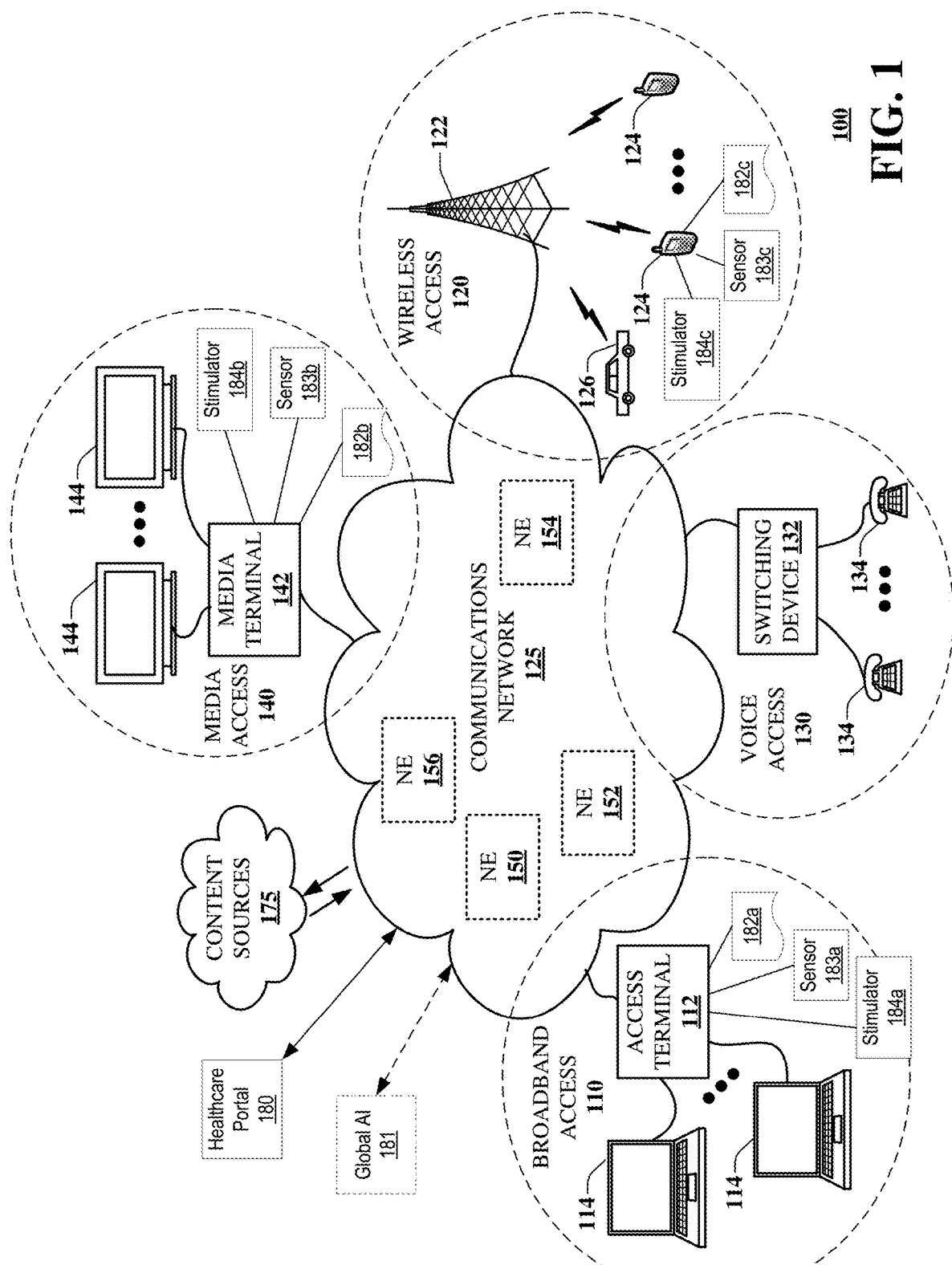
FIG. 1 is a block diagram illustrating an exemplary, non-limiting embodiment of a communications network adapted for early detection and treatment in healthcare in accordance with various aspects described herein.

The subject disclosure describes, among other things, illustrative embodiments for evaluating sensor data obtained from an environment occupied, on occasion, by an individual, analyzing the sensor data to detect an anomaly, associating a condition of the individual with the anomaly and adjusting a condition of the environment according to a theme adapted to affect the individual according to the condition. Other embodiments are described in the subject disclosure.

One or more aspects of the subject disclosure include a process that includes receiving, by a processing system including a processor, sensor data from a group of sensors arranged within an environment. The sensor data includes observations of an individual. The sensor data is analyzed to obtain an analysis result and a treatable condition of the individual is identified according to the analysis result. A treatment is determined according to the treatable condition and an environmental stimulus is actuated based on the treatment, wherein the environmental stimulus is adapted to mitigate symptoms of the treatable condition of the individual.

One or more aspects of the subject disclosure include a system, having a processing system including a processor and a memory that stores executable instructions that, when executed by the processing system, facilitate performance of operations. The operations include obtaining sensor data from a group of sensors arranged within an environment, the sensor data including observations of an individual. The sensor data is analyzed to obtain an analysis result and a condition of the individual is detected according to the analysis result to obtain a detected condition. A treatment is associated with the detected condition and an environmental theme is applied to the environment according to the treatment.

One or more aspects of the subject disclosure include a non-transitory, machine-readable medium, comprising executable instructions that, when executed by a processing system including a processor, facilitate performance of operations. The operations include obtaining sensor data from a group of sensors arranged within an environment, the sensor data including observations of an individual. The sensor data is analyzed to obtain an analysis result and a condition of the individual is detected according to the analysis result. A treatment is associated with the condition and an environmental theme applied to the environment according to the treatment.

Depression is a common illness that affects many millions of people worldwide. Extraordinarily large numbers of individuals also suffer from other disorders, such as dementia and Alzheimer's, with millions of new cases occurring each year. Even though effective treatments for at least some disorders or diseases may exist. Many who suffer from such conditions or disorders may receive insufficient, or even worse, no treatment due to a lack of resources, a lack of trained healthcare providers and/or inaccurate assessments.

Generally, there are signs of such symptoms that, if detected sufficiently early, may help to reduce a risk of further development of the disorder. Considering, as an example, depression, common symptoms may include loss of interest in daily activities, sleep changes, especially waking in the early hours of the morning or oversleeping, anger, concentration problems, etc. At least some of these symptoms may be observable through daily life routines, which may provide an early sign of depression, possibly identifying a need for urgent and/or immediate attention from a healthcare professional.

Disclosed herein are elements of an automatic system adapted to assist detection of disorder symptoms at home or a facility that can provide supplemental resources that may alleviate the lack of resources, manpower issues mentioned above. In at least some applications, an observation disorder detection system may be equipped with privacy preserving artificial intelligence and/or machine learning (AI/ML) models for symptom detection. It is to assist domain experts make faster and more accurate diagnostic decision. Also, the system can apply certain preventative steps, by coordinating devices deployed in the location and adapting the location theme dynamically to help or assist treatments of disorders.

This system and/or services disclosed herein may be offered as a part of an Internet and/or cloud service provider's smart-home solutions. When offered, these types of products and/or services may be a service differentiator from other cloud providers.

Referring now to FIG. 1, is a block diagram illustrating an exemplary, non-limiting embodiment of a communications network 100 adapted for early detection and treatment in healthcare in accordance with various aspects described herein. For example, the communications network 100 can facilitate in whole or in part, obtaining sensor data from a group of sensors arranged within an environment, analyzing the sensor data, detecting a condition of an individual present within the environment according to the analysis, associating a treatment with the condition and applying an environmental theme to the environment according to the treatment. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments, the broadband access 110 portion of the communications network 100 may include one or more of a sensor 183a, an environmental stimulator 184a and/or executable instructions 182a adapted to facilitate recognition of a behavioral condition of an individual, and in at least some instances, adaptation of an environment to affect the individual in a manner to address and/or otherwise improve the behavioral condition. For example, the executable instructions 182a may be implemented by one or more of the data terminals 114 and/or the access terminal 112. Alternatively or in addition, the executable instructions 182a may be implemented on a separate processing device in communication with one or more of the data terminals 114 and/or the access terminal 112.

Likewise, in at least some embodiments, the media access 140 portion of the communications network 100 may include one or more of a sensor 183b, an environmental stimulator 184b and/or executable instructions 182b adapted to facilitate recognition of a behavioral condition of an individual, and in at least some instances, adaptation of an environment to affect the individual in a manner to address and/or otherwise improve the behavioral condition. For example, the executable instructions 182b may be implemented by one or more of the display devices 144 and/or the media terminal 142. Alternatively or in addition, the executable instructions 182b may be implemented on a separate processing device in communication with one or more of the display devices 144 and/or the media terminal 142.

It is envisioned further, that in at least some embodiments, the wireless access 120 portion of the communications network 100 may include one or more of a sensor 183c, an environmental stimulator 184c and/or executable instructions 182c adapted to facilitate recognition of a behavioral condition of an individual, and in at least some instances, adaptation of an environment to affect the individual in a manner to address and/or otherwise improve the behavioral condition. For example, the executable instructions 182c may be implemented by one or more of the mobile devices 124, the vehicle 126 and/or the base station or access point 122. Alternatively or in addition, the executable instructions 182b may be implemented on a separate processing device in communication with one or more of the display devices 144 and/or the media terminal 142.

The executable instructions 182a, 182b, 182c, generally 182, may be adapted to operate independently or in any combination to facilitate one or more of monitoring an individual to obtain monitored information, evaluating the monitored information to identify an anomaly, preparing a summary report addressing the anomaly and providing the summary report to a domain expert, such as a healthcare professional. In at least some embodiments, the executable instructions 182 may be adapted to facilitate adaptation of an environment to affect an individual's recognized condition in a manner that addresses and/or otherwise improves the individual's behavioral condition, e.g., according to the example techniques and scenarios disclosed herein.

The example communications network 100 may include one or more communication channels and/or network links to one or more healthcare provider facilities. According to the illustrative example, the communications network 100 includes a healthcare portals 180. The healthcare portal may be used to access monitored information, e.g., as obtained from the sensors 183a, 183b, 183c, generally 183, and/or summary reports based upon the monitored information. Such reports may include one or more of examples of monitored information, summary reports based upon the monitored information, comparisons of monitored information with historical records, and so on. In at least some embodiments, a summary report may be provided responsive to detection of an anomaly for inspection and/or evaluation via the healthcare portal 180. An anomaly may be determined by the executable instructions based on one or more of monitored information, historical records of monitored information, evaluation of the monitored information in view of a personal model of an individual and/or class of individuals for which the monitored information was obtained, and so on.

In at least some embodiments, the communications network 100 includes an artificial intelligence (AI) processor, shown as a global AI processor 181. The AI processor 181 may be adapted to recognize health-related conditions, based on monitored information. By way of nonlimiting example, the AI processor 181 may include an artificial neural network, e.g., a deep neural network, implementing multiple layers between an input and an output. The input may include one or more elements of monitored information, whereas the output may include a health-related condition, such as a behavioral condition. The AI processor 181 may be trained on training set of data alone or in combination with data obtained from other individuals as may be obtained from sensors deployed in other environments. Such a trained neural network may be updated from time to time, e.g., based on more recently obtained information in view of, similar sensors, new sensors, and in at least some instances, in view of evaluations, diagnoses, and/or success criteria as may be provided by a domain expert, such as a healthcare professional.

Figure 2A:
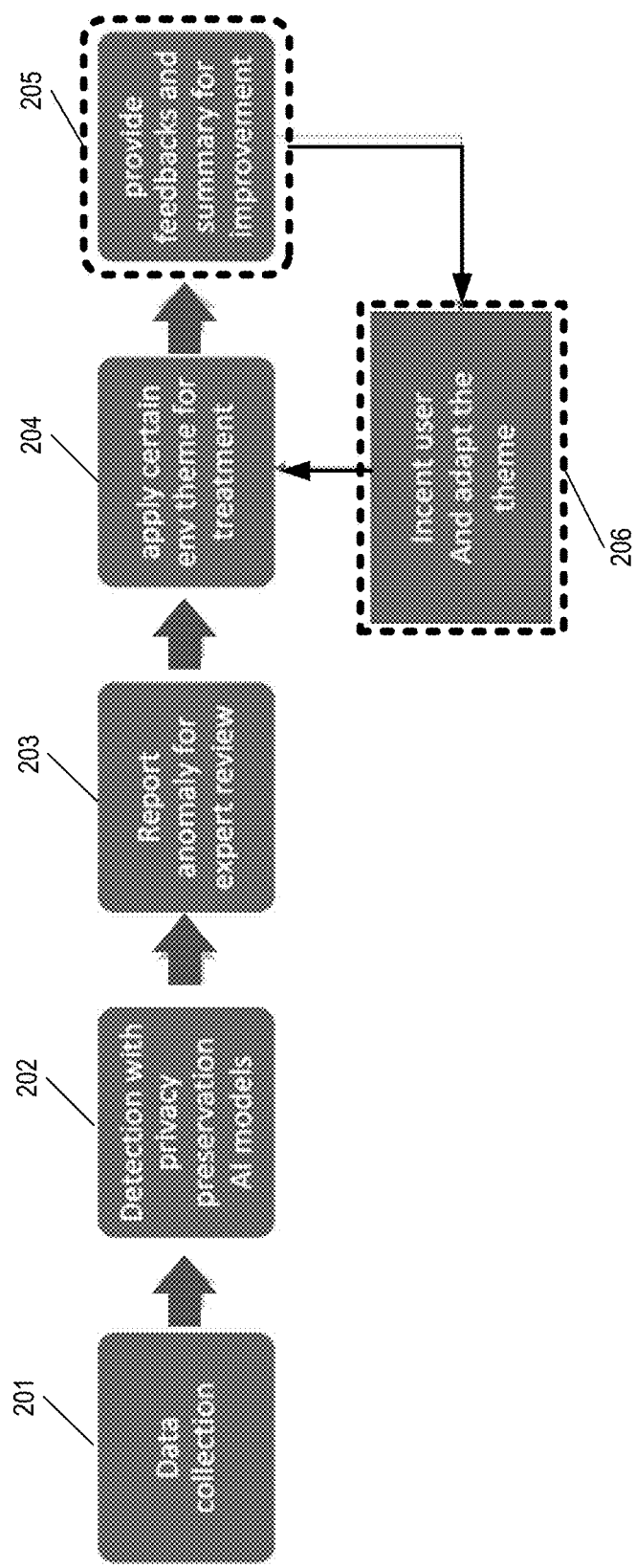
FIG. 2A is a block diagram illustrating an example, non-limiting embodiment of a system functioning within the communication network of FIG. 1 and adapted for early detection and treatment in healthcare in accordance with various aspects described herein.

FIG. 2A is a block diagram illustrating an example, non-limiting embodiment of an early detection and treatment system 200 functioning within the communication network of FIG. 1 and adapted for early detection and treatment in healthcare in accordance with various aspects described herein. The system 200 may include one or more portions, functions, segments, and/or modules. A first part of the system 200 may provide for early detection of symptoms. In at least some embodiments, the early detection portion offers privacy preserving features, such as privacy preserving artificial intelligence (AI) and/or machine learning (ML) models adapted for symptom detection. Data collection may be done with local sensors such as cameras, microphones, etc.

The system 200 may utilize AI methods that incorporate privacy into their designs. For example an AI/ML symptom detection model may be configured to recognize actions and/or intention of a user, such as walking, eating, sleeping, sitting, without associating any identity and/or other sensitive information. Some AI/ML models may be adapted to detect and/or otherwise infer emotions, e.g., from observed body language. Beneficially, AI/ML models may be adapted to observe and/or otherwise summarize such actions over extended periods of time, e.g., days, weeks, months or even years, to detect whether some may be characterized as abnormal. For example, loss of interest in daily activities, sleep changes can be picked up by AI/ML models when combined with observational data collection, e.g., sensors.

In at least some embodiments, the techniques disclosed herein may be adapted to apply treatment, including early treatment applied as soon as practical after detection of onset of a possible condition. For example, once an AI/ML model detects that there may be anomalies associated with observed user activities that indicate signs of a disorder, the anomalies may be shared, privately, with domain experts, e.g., for evaluation by a domain expert, such as a healthcare professional. A summary of automated observations, detections and/or projections of the AI/ML model may be provided to the domain expert to facilitate efficient and thorough evaluations by a trained individual or group and/or otherwise another with recognized expertise in the area being evaluated. Once it has been determined that a particular condition has been recognized in association with an observed individual, one or more suggestions may be made, e.g., by the healthcare professional, and automatically applied to the observed individual's environment to induce positive changes to facilitate a treatment and/or prevention process.

In at least some embodiments, a local device proximal to the observed environment, e.g., a home controller, may be used to coordinate among devices and/or automate certain suggestion and/or provide a local caregiver, e.g., a family member, with a list of items to pay attention to in order to start treatment. Without limitation, the home controller may include a residential gateway and/or a smart home assistant.

Various technologies can be part of the solution such as location based ultrawideband (UWB) technologies that can determine a location of a user and/or an object, various Internet of Things (IoT) devices may be utilized as sensors and/or to provide reminders and/or actuators of commands. Feedback and/or signs of improvement or worsening may also be automatically summarized by elements of the system and report back to the domain experts or professionals. In this regard, the system may assist the experts with feedback that allows them to improve their suggestions to the particular observed individual or to others more generally.

By way of nonlimiting example, a sleeping disorder may be treated by a home controller configured to schedule a sunrise timer for bedroom lights that slowly light each morning to gently wake up an observed individual or user. For anger issues, the smart speaker may detect that the user is physically close to it and play soothing music and/or a customized voice clip, e.g., previously recorded by a family member, loved one, evaluating domain expert(s) or professional(s). For concentration issues, the home controller may suggest certain activities, such as games to play by the user and/or with others nearby. For loss of interest in daily activities, certain local activates may be suggested, such as charity work, book club, outdoor group, as may be beneficial to help broaden the user's outlook or mind.

The example early detection and treatment system 200 includes a data collection module 201 in communication with a detection module 202, which is in further communication with a reporting module 203. The data collection module 201 may be adapted to monitor actions and/or a conditions of an individual to obtain monitored information. The monitored information may be provided to the detection module 202, which may be adapted to detect an anomaly based upon the monitored information. An anomaly may be defined as a condition that departs from an expected norm and/or historical observations. In at least some embodiments, a class or type of anomaly to be detected may be predetermined based on an intended application. For example, according to the illustrative examples, the intended application may be to evaluate a physical and/or behavioral condition of an individual, to detect anomalies that may be indicative of a physical and/or behavioral state of the individual.

The detection module 202 is in further communication with a reporting module 203. For example, the detection module 202 may provide an indication of a detected anomaly to the reporting module 203. In at least some embodiments, the indication of the detected anomaly may be conclusory, e.g., identifying a possible condition and/or diagnosis of an observed individual, possibly with an observation time, a number of detected anomalies and/or a frequency of any detected anomalies. The reporting module 203 may be adapted to prepare a summary report providing an indication of a detected anomaly, possibly with summary information of observations obtained from the data collection module 201. It is envisioned that in at least some embodiments, the reporting module 203 provides detected anomalies and/or summary reports to a healthcare provider for evaluation by a trained professional, i.e., an expert with respect to any reported anomalies. Accordingly, the summary report may provide a summary of the observed conditions upon which any anomalies may have been detected to provide further insight to the trained professional. For behavioral anomalies, such as depression, the reports may be provided to a psychiatrist and/or psychologist. For other anomalies, such as cognitive conditions, the reports may be provided to a primary care provider, a neurological specialist, and/or a geriatric specialist. For physical conditions, such as heart and/or respiratory conditions, the reports may be forwarded to a cardiologist, etc.

In at least some embodiments, the early detection and treatment system 200 includes a treatment module 204. According to the illustrative example, the reporting module 203 is in further communication with a treatment module 204, e.g., providing information regarding one or more of detected anomalies, associated conditions of an observed individual and/or related diagnoses. Identification of detected conditions and/or diagnoses may be derived and/or otherwise obtained by the early detection and treatment system 200, e.g., by the detection module 202, the reporting module 203 or a combination of both modules 202, 203. Alternatively or in addition, identification of any detected conditions and/or related diagnoses may be obtained responsive to expert review. In at least some embodiments, the expert having reviewed reports provided by the reporting module 203 may certify an automatically determined condition. Such certifications may be provided based on the monitored and/or reported information alone and/or in combination with a clinical assessment obtained from the expert review. Alternatively or in addition, identification of any detected condition or related diagnoses may be based solely on the expert review.

Having identified a condition and/or diagnosis, the treatment module 204 may determine a course of treatment adapted to mitigate symptoms of the identified condition and/or diagnosis. In at least some embodiments, treatment includes adaptation of an environment of the user. Without limitation, environmental adaptations may include actual changes in one or more environmental conditions, such as ambient lighting, ambient temperature, ambient sonic environment, airflow, and the like. Alternatively or in addition, environmental adaptations may include instructions and/or recommendations for the observed individual and/or another close-by individual to take some action to adapt an environmental condition. Recommendations may include suggestions for the monitored individual to modify their behavior, e.g., by initiating exercise, by initiating rest. Alternatively or in addition, such recommendations may include motivational instructions adapted to alter a mood of the monitored individual in a constructive manner to address and/or otherwise improve the detected condition and/or diagnosis.

It is envisioned that in at least some embodiments, the treatment may prescribe an environmental theme that may adapt one or more environmental conditions in a cooperative manner to adapt an environment of the observed individual in a most effective manner. Consider an individual diagnosed as being in an agitated state. Responsive to this diagnosis, the treatment module 204 may provide instructions and/or controls to environmental systems adapted to alter environmental stimuli. Consider the treatment module 204 providing control signals adapted to lower lighting, to reduce temperature and/or to play soothing sounds or music, that alone or in combination may be adapted to calm the individual down.

In at least some embodiments, the early detection and treatment system 200 includes one or more of a feedback module 205 and an environmental adaptation module 206. The feedback module 205 is in communication with the treatment module 204, e.g., receiving an indication of an environmental theme applied for treatment. The feedback module 205 may be adapted to obtain feedback providing an indication of the effectiveness of the applied treatment. The feedback may be obtained from one or more of the data collection module 201, the detection module 202 and/or the reporting module 203. For example, sensor input may be obtained by the data collection module subsequent to application of a treatment environmental theme. The sensor data may be compared to earlier sensor data to identify any differences or trends that may suggest the treatment is effective. Alternatively or in addition, a lack of anomalies detected by the detection module 202 and/or favorable reporting by the reporting module 201 subsequent to application of the treatment environmental theme may further suggest that the treatment is effective. In at least some embodiments, feedback may include direct input obtained from the treated individual, e.g., responsive to an inquiry posed by the feedback module 205, and/or similar input obtained from others sufficiently close to observe any alterations to the individual's behavior or condition.

To the extent that the feedback module 205 determines that the treatment is effective, the feedback module 205 may provide a positive feedback signal to the environmental adaptation module 206 indicating the current environment theme is effective and that no further changes are necessary. Alternatively, the feedback module 205 may refrain from affecting further changes to the environmental theme responsive to a determination that the treatment is effective. However, to the extent that the feedback module 205 determines that the treatment is ineffective, and/or insufficiently effective, the feedback module 205 may provide a feedback input to the environmental adaptation module 206, e.g., a negative feedback signal indicating that further modification of the environmental theme is necessary. The environmental adaptation module 206, responsive to such a negative feedback signal, may enhance and/or otherwise modify a previously applied environmental theme. For example, a first modification may dim the lighting, whereas a further modification may add soothing sounds or music.

In at least some embodiments, the data collection module 201 collects data over an extended period of time, referred to herein as an observation period. The collected data may include sensor data obtained from one or more sensors deployed in an environment. In at least some embodiments, the collected data may be provided to the detection module in a raw format, e.g., as sensor data and/or sensor data with a time reference. The sensor data may be collected continuously and/or discretely, e.g., to obtain a time series of sensor data. For example, the sensor data may be obtained according to a sample interval, e.g., every 1 sec, every 10 sec, every 1 minute, every 10 minutes, and so on. Alternatively or in addition, the sensor data may be collected responsive to an event. For example, the data collection module 201 may collect sensor data responsive to an observe change in the sensor data. Examples may include, without limitation movement of an object within a monitored environment, a change in lighting, detection of a sound, a change in a detected sound, and so on. Other examples may include, without limitation, user interaction with a device, such as a computer, a smart phone, an entertainment system and/or a household appliance, such as an opening of a refrigerator door, utilization of a microwave oven, a coffee pot, and the like. Still other examples may include, without limitation a change in a biometric parameter, such as heart rate, blood pressure, pulse, blood oxygen level, body temperature, skin salinity, and so on. In at least some embodiments the monitored sensor data is associated with a time variable, such as an absolute time, and/or a time in reference to a time marker.

Figure 2B:
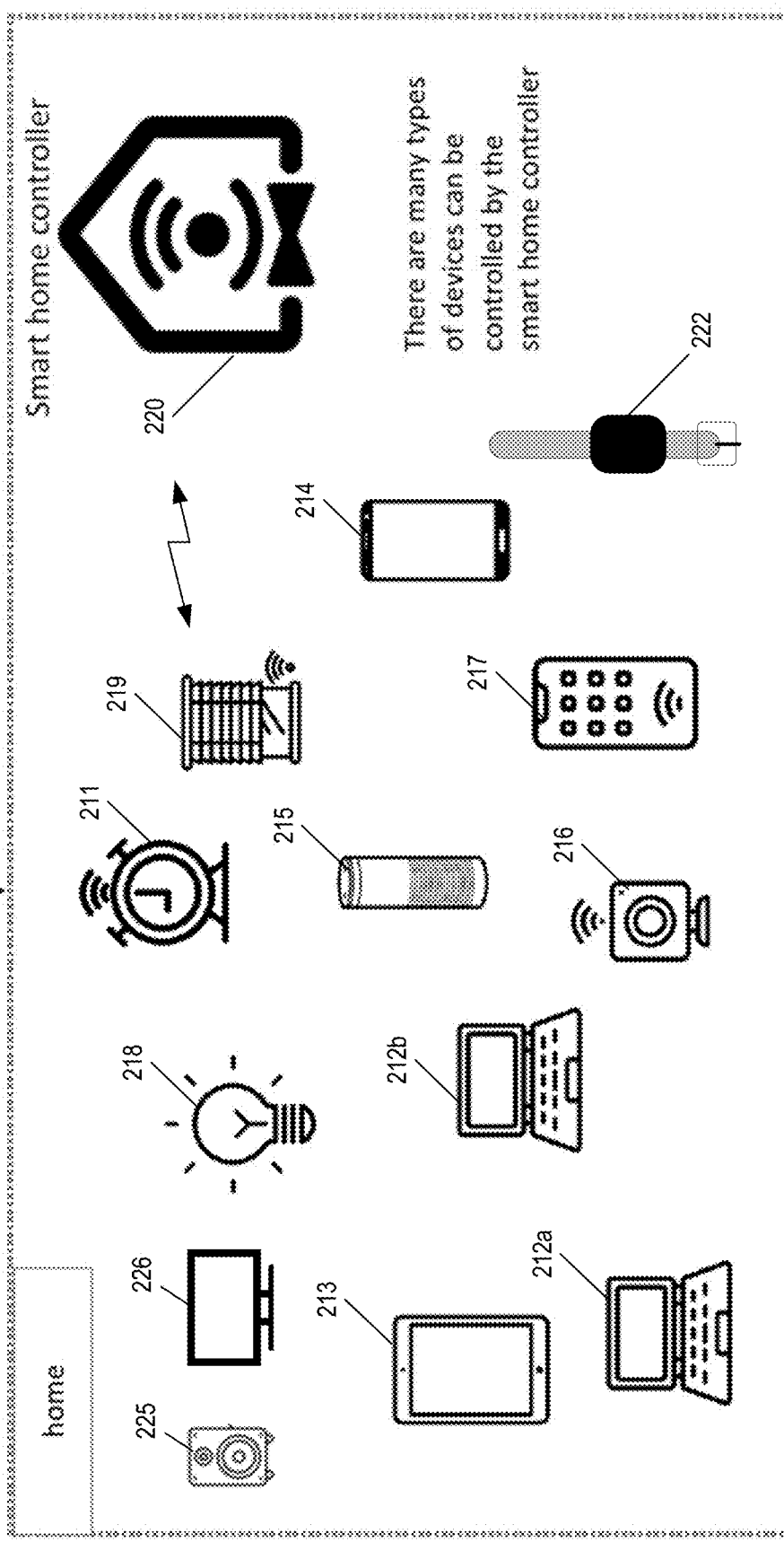
FIG. 2B is a block diagram illustrating an example, non-limiting embodiment of an example venue adapted for early detection and treatment in healthcare in accordance with various aspects described herein.

FIG. 2B is a block diagram illustrating an example, non-limiting embodiment of an example system 210 located at a venue 224 and adapted for early detection and treatment in healthcare in accordance with various aspects described herein. According to the illustrative example, the venue is a home venue 224. The system 210 includes one or more devices, such as sensors, adapted to sense information from within the home venue 224. Sensors may include, without limitation a motion detector, a video camera 216, a microphone, e.g., a microphone of a digital assistant 215, a smart watch 222, a phone 214, a smart phone 217, a tablet device 213, a personal computer 212a, 212b, and the like.

According to the illustrative embodiment, the system 210 also includes at least one smart home controller 220. The smart home controller 220 may be in communication with one or more of the sensors 212, 213, 214, 215, 216, 217, 222, e.g., receiving sensory information from one or more of the sensors. Thus, the smart home controller 220 may be adapted to perform data collection based on the sensory input. Alternatively or in addition, the smart home controller 220 may be configured with functionality to evaluate the sensory information alone or in combination with a remote processor in order to detect anomalies regarding a behavior and/or a physical condition of an individual. The smart home controller 220 may be further configured to prepare a summary report based on anomaly detection, and to provide the summary report to a domain expert, such as an example healthcare professional.

The system 210 also includes at least one environmental stimulator(s) adapted to modify and/or otherwise affect a feature of the environment. According to the illustrative example, the environmental stimulator(s) may include one or more of a light 218, an alarm 211, a remotely operable window and/or window shade 219, a speaker, e.g., a speaker of the digital assistant 215, a phone 214, a smartphone 217, a tablet device 213, a personal computer 212, a smart watch 222, an audio system 225 and/or a television, such as a smart TV 226. The smart home controller 220 may be adapted to operate and/or otherwise control one or more of the environmental stimulator(s) to implement a change to one or more environmental conditions. Preferably, any induced changes to environmental conditions are adapted to mitigate symptoms of an observed and/or otherwise detected or diagnosed condition.

Consider a diagnosis of depression. In such instances, the smart home controller 220 may be adapted to control one or more of the environmental stimulator(s) in a manner adapted to counteract a depressed state. For example, the smart home controller 220 may increase lighting intensity, and/or change a lighting to a warmer color to invoke a feeling of contentment. Other changes may include playing upbeat music, opening a window and/or a window shade, recommending and/or providing visual stimuli, such as digital photos and/or videos of cheerful content. In at least some embodiments, the smart home controller 220 may include functionality to obtain feedback and/or to adapt an environmental theme responsive to such feedback.

Figure 2C:
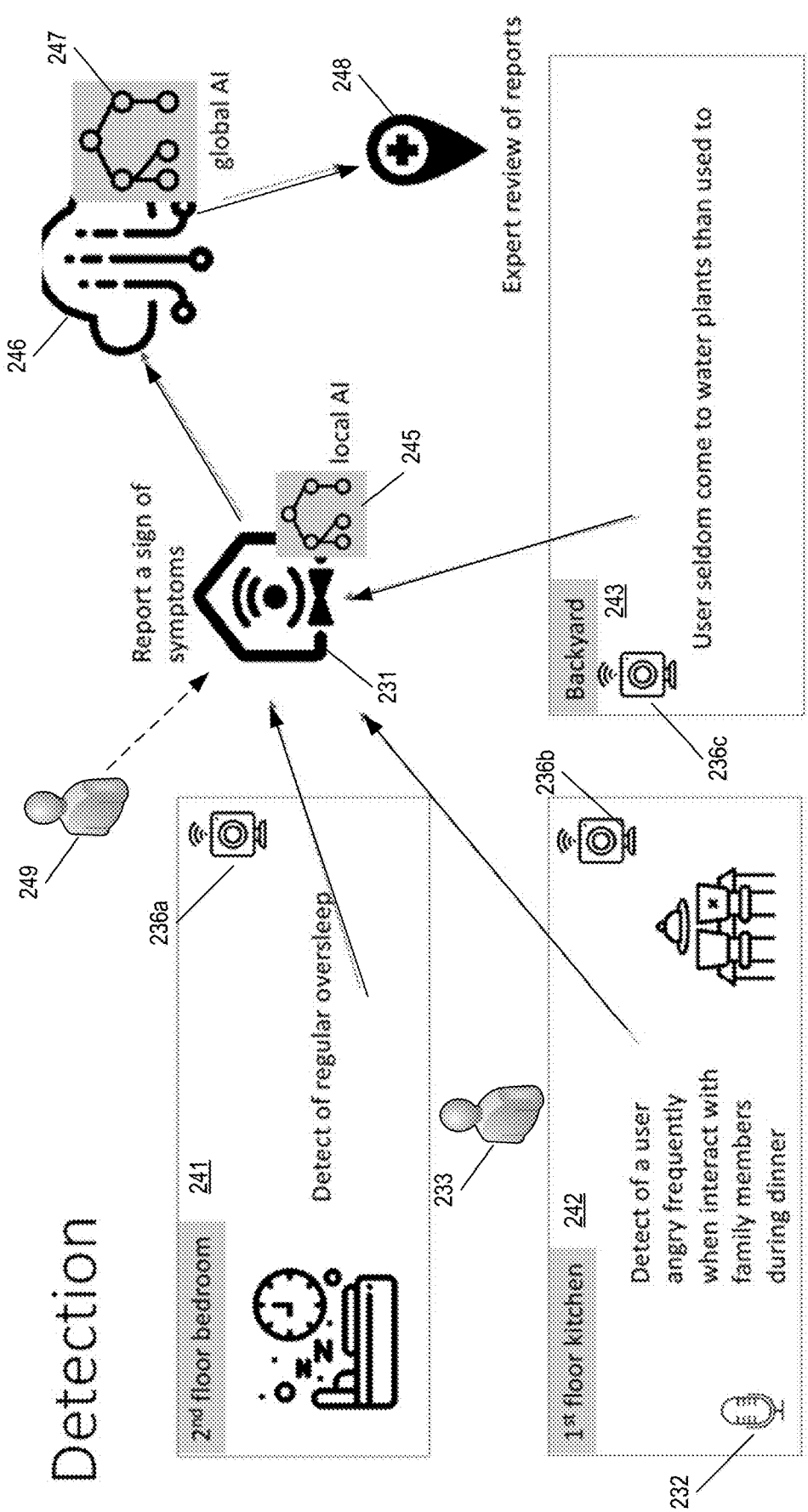
FIG. 2C is a more detailed block diagram illustrating an example, non-limiting embodiment of a system functioning within the communication network 100 of FIG. 1 and adapted for early detection in healthcare in accordance with various aspects described herein.

FIG. 2C is a more detailed block diagram illustrating an example, non-limiting embodiment of a system 230 functioning within the communication network 100 of FIG. 1. The example system 230 is adapted for monitoring a venue to detect healthcare issues of one or more individuals present at the venue. The particular example illustrates a home venue 240 that includes a second floor bedroom environment 241, a first floor kitchen 242 and a backyard 243. Each of the environments 241, 242, 243 includes at least one sensor adapted to monitor a condition and/or activity or lack thereof, occurring at the home venue 240. The bedroom environment 241 may include a sensor, such as a microphone, a motion detector and/or a video camera 236*a*. Likewise, the kitchen environment 242 may include a motion detector, a video camera 236*b* and/or a microphone 232. The backyard 243 may also include one or more sensors, such as the example video camera 236*c*. Although the cameras 236*a*, 236*b*, 236*c*, generally 236, and the microphone 232 are shown, it is understood that the sensors may include, without limitation, one or more of cameras, microphones, motion detectors, thermal detectors, light sensors, digital cameras, vibration sensors, and the like. Other sensors may include user devices, such as digital assistants, entertainment systems, remote control devices, smartphones, telephones, wearable devices, such as smart watches, biometric monitors, such as thermometers, salinity detectors, skin conductivity detectors, heartrate and/or pulse monitors, blood pressure monitors, and so on.

In at least some embodiments, the sensors monitor their respective environments, providing sensor data may be obtained from one or more local observers 249. For example, a local observer 249, such as an observing family member, may provide data that includes observations of a monitored family member. Such inputs from the local observer 249 may be provided to a smart home controller 231 and/or directly to a domain expert, such as a healthcare professional 248. User input from the local observer 249 may include one or more of a voice message, a textual message, a photograph, a video clip, a user response to an inquiry, e.g., responses to particular questions that may be relevant in recognizing and/or evaluating a progression of condition of an observed individual 233.

Each of the sensors 232, 236 may be in communication with a local processing device, such as a home-based processor, e.g., the smart home controller 231. The smart home controller 231 may be adapted to receive sensor data from one or more of the sensors 232, 236 and/or inputs from the local observer 249. In at least some embodiments, the smart home controller 231 may be adapted to evaluate the sensor data and to detect one or more anomalous situations, or anomalies, based at least in part on the sensor data. Anomalies may include, without limitation, sensory input indicative of a behavioral issue and/or physical condition of an individual present within the home venue 240. For example, sleep patterns may be inferred from activity recorded by a bedroom sensor, e.g., the camera 236*a*, within the bedroom. The camera 236 in the bedroom environment 241 may record an observed individual's sleep patterns, reporting sensory information from the bedroom environment 241 that may include an indication that the observed individual 233 is present within the bedroom, indicating further whether the observed individual 233 is active or resting. Periods of rest or sleep observed by the camera 236*a* may be reported to the smart home controller 231, e.g., as sleep start and/or end times, durations, frequency, restlessness or lack thereof during periods of sleep and so on. For example, regular oversleeping may be an indication of a psychological condition, such as depression.

Likewise, other sensors, such as the microphone 232 may detect noises, such as dialog, speech, non-speech utterances, noise levels. The microphone 232 may provide sensory information that may include speech volume level, speed and/or cadence, contextual speech information, e.g., applying speech recognition and/or interpretation, and/or non-contextual speech information. The microphone 232 may report recorded audio of the observed individual 233 to the smart home controller 231, which may be process the recorded audio data to obtain one or more of the example cadence and/or voice level in dialog. The system 230, e.g., the smart home controller 231, may process the recorded audio to identify which person(s) are present, e.g., applying voice recognition and/or correlation of recorded audio with recorded video that may apply facial recognition to identify audio attributable to the observed individual 233. The smart home controller 231, in turn, may infer whether the kitchen environment is friendly, relaxed, excited and/or agitated, as may be indicative of an argument or quarreling.

Alternatively or in addition, the kitchen camera 236*b* may provide sensory information obtained from the kitchen environment 242 to the smart home controller 231. Sensory information may include images and/or video data that indicates whether a person or persons are present. The recorded images and/or video may be provided to the smart home controller 231, which may apply further processing, such as facial, recognition to identify which person(s) are present. The recorded images and/or video data may include indications of one or more of postures, positions, and/or movements that may be associated with particular individuals present within the kitchen. The smart home controller 231 may further analyze the images and/or video to interpret behavioral context, e.g., mood, from one or more of the postures, positions and/or movements of the individual(s). The smart home controller 231, in turn, may infer from the image and/or video data whether the kitchen environment is friendly, relaxed, excited and/or agitated, as may be indicative of an argument or quarreling.

According to the illustrative example, a backyard camera 243 may record images and/or video obtained from the backyard environment 243, providing the recorded information to the smart home controller 231, which may process the recorded information. Processing may include any of the foregoing, including identifying person(s) using facial recognition, presence of the individual in the backyard, associated times, durations and/or frequency.

The smart home controller 231 may be in communication with a communication network 246 and adapted to report anomalous conditions and/or signs of symptoms to a healthcare professional 248 for expert review that may include further analysis, evaluation and/or concurrence of any diagnoses as may be determined by the smart home controller 231. The communication network 246 may include systems and/or services provided by one or more of an Internet service provider, a cable service provider, a telephone service provider, a mobile communication service provider, and/or a private network, e.g., a local area network and/or an enterprise network.

In at least some embodiments, the smart home controller 231 is adapted to analyze sensor data to detect one or more anomalies, one or more medical conditions and/or healthcare issues. Alternatively or in addition, the smart home controller 231 may analyze the sensor data to detect changes to previously identified healthcare issues. In at least some embodiments, the smart home controller 231 may employ machine learning and/or artificial intelligence to facilitate analyses of the sensor data. For example, the smart home controller 231 may apply machine learning in order to identify an anomaly and/or a medical condition, and/or a change in a previously identified medical condition based on a machine interpretation of data obtained from one or more of the sensors 232, 236 and/or reported by the local observer 249.

The example system 230 includes a local artificial intelligence (AI) module providing an AI model 245 that may be adapted to apply machine learning. In at least some embodiments, the local AI model 245 includes a program and/or algorithm that utilizes a set of data that enables it to recognize certain patterns in the sensory input that may be indicative of an anomaly and/or a medical condition. By way of illustrative example, the local AI model 245 may implement a neural network, such as a deep learning neural network, e.g., a convolutional neural network, which includes multiple interconnected nodes or neurons adapted to receive inputs, e.g., from the sensors, and recognize an anomaly and/or a medical condition, and/or a change in a previously recognized medical condition from patterns of sensory input data.

A neural network model may be exposed to a training period, in which the model may be provided with a training dataset. For example, the training dataset may include a sensory dataset that has been separately correlated with one or more recognized anomalies and/or a medical condition(s), and/or change(s) in previously recognized medical condition(s). During training, weights of the network, e.g., the nodes or neurons, may be updated responsive to errors the model makes on the training dataset. Once suitably trained, e.g., the errors observed responsive to the training dataset are below an acceptable threshold value, the trained neural network may be provided with observed sensor data. The trained neural network may provide an output that may be indicative of one or more recognized anomalies and/or a medical condition(s), and/or change(s) in previously recognized medical condition(s). Accordingly, the local AI model 245 may be trained to recognize one or more anomalies and/or medical conditions.

In at least some embodiments, the AI model 245 may apply privacy preserving measures adapted to protect personal information that may related to an individual being observed and/or otherwise evaluated and/or sensor data obtained from a venue being monitored. At least some of the privacy preserving measures may be applied during any training, such as training of the local AI model 245 and/or training of the remote or global AI model 247. In at least some of the privacy preserving approaches, any training data obtained and/or otherwise generated in relation to an observed individual and/or the venue 240, may be retained locally, e.g., within a local system, device or network of a venue 240, without ever leaving that venue 240. Alternatively or in addition, the local AI model 245 may be trained, adjusted and/or otherwise tuned so that it can be more accurately evaluate, detect and/or otherwise predict conditions, disorders and/or diseases within a local environment, such as the example venue 240.

In at least some embodiments, the local AI model 245 may be trained in part or in whole based on data from observations of other individuals that may or may not be related to the particular user. For example, the local AI model 245 may be trained on data from observations of other family members. Alternatively or in addition, the local AI model 245 may be trained on data from observations of other persons with similar demographics, and/or similar lifestyles, and/or belonging to common affinity groups, cohorts, and/or having other similar characteristics. In at least some embodiments, training of the local AI model 245 may be accomplished while maintaining anonymity of the sensor data obtained at the venue 240. For example, training of the local AI model 245 may be accomplished entirely remote from the venue, without utilizing sensor data obtained from the venue 240, and then provided to the venue 240 as a trained AI model 245 for use therein. Alternatively, training of the local AI model 245 may be performed entirely within the venue 240, e.g., based on data observed at the venue 240 alone, or based on external training data provided to the venue 240, or based on some combination thereof.

In at least some embodiments, the system includes a global AI model 247. The global AI model 247 may be in communication with one or more of the local AI model 245 and the smart home controller 231 vial the communication network 246. The global AI model 247 may be trained in a similar manner to provide an output that may be indicative of one or more recognized anomalies and/or a medical condition(s), and/or change(s) in previously recognized medical condition(s). Training of the global AI model 247 may be accomplished without exposing data from observations made at the venue 240, e.g., by training on data from observations of other persons at other locations with similar demographics, and/or similar lifestyles, and/or belonging to common affinity groups, cohorts, and/or having other similar characteristics. Alternatively or in addition, the global AI model 247 may be updated and/or trained by aggregating individual local AI models 245 from one or more different venues. In such instances, any privacy revealing data of the individual local AI models 245 may be blocked and/or otherwise adjusted to preserve privacy information. In at least some embodiments, one or more elements of the local model 245 may be trained at least in part based on data obtained at the corresponding local venue. The one or more elements may include weight factors of one or more nodes of a neural network that have been adjusted based on the local venue data. The local model 245 may be shared externally to the venue, in its entirety and/or at least a portion of the local model, e.g., a weighted node and/or level of weighted nodes of the AI model 245, e.g., to facilitate learning of a local model at another venue and/or the global model 247, without exposing private information. The global AI model 247, once suitably trained, may be provided to the venue 240, for use therein, e.g., as the suitably trained local AI model 245. Thus, the trained local AI model 245 may operate at the venue 240 based on training obtained via the global AI model 247, to recognize anomalies and/or conditions based on data from observations made at the venue 240, without exposing any observations, e.g., sensor data, and/or identities outside of the venue 240.

Federated learning may be applied to the local and global AI models 245, 247 to enables users to train a model without sending raw data to a central server, thus avoiding the collection of privacy-sensitive data. Often this may be done by learning a single global model for all users, even though the users may differ in their data distributions. For example one or more trained global AI models 247 may be deployed to the venue, e.g., to the smart home controller 231, as one or more local AI models 245. It is envisioned that updates to the global AI model 247 may be obtained from time to time, in which instances, updated local AI models 245 may be provided over the communication network 246 to participating venues, such as the example venues 240. In at least some embodiments, an additional training set may be applied at the local venue 240 to further train, modify, improve and/or otherwise adjust the received global AI model 247. For example, a supplemental training set may be developed for the venue and/or class of similar venues.

The local AI model(s) 245 may receive sensor data obtained from the venue 240 and operate to produce one or more outputs that may be indicative of one or more target anomalies and/or a medical condition(s), and/or change(s) in previously recognized medical condition(s). Beneficially, such a local application of the globally trained, local AI model 245 permit recognition of any target anomalies and/or a medical condition(s), and/or change(s) in previously recognized medical condition(s), without having to exchange, provide and/or otherwise expose local sensor data and/or personal data outside of the venue 240.

To the extent any anomalies or indications are detected, they may be provided to a domain expert 248, such as a healthcare professional, via a secure communication. Anomaly detection may include, without limitation, an output of the local AI model 245 indicative of one or more target anomalies and/or a medical condition(s), and/or change(s) in previously recognized medical condition(s). For example, the smart home controller 231 may be configured to automatically forward any outputs of the local AI model that correspond to targets. The outputs may be provided in a form of an alarm and/or in a summarized manner. For example, outputs of the local AI model 245 indicative of one or more target anomalies and/or a medical condition(s), and/or change(s) in previously recognized medical condition(s) may be stored locally, e.g., at the smart home controller 231 and reported to the healthcare professional 248 in a summary report. The summary report may identify the observed individual, as well as any detected target anomalies and/or a medical condition(s), and/or change(s) in previously recognized medical condition(s).

The summary report may identify a number and/or type of detected anomaly or condition, a time associated with the detection, a frequency of similar detections, a separation between repeated detections, and the like. In at least some embodiments, the summary report may include further insight to the healthcare professional, such as sensory input data associated with one or more detected anomalies of conditions. The additional data may provide further insight to allow the domain expert 248 to confirm a detected target anomalies and/or a medical condition(s), and/or change(s) in previously recognized medical condition(s), and/or to modify any automatically generated detected anomalies or conditions. The summary reports and/or communications including summary report data may be encrypted and/or otherwise manipulated in a manner to safeguard unintended exposure of sensitive information related to one or more of the observed individual, the venue, the sensory data, and/or the target anomalies and/or a medical condition(s), and/or change(s) in previously recognized medical condition(s).

Figure 2D:
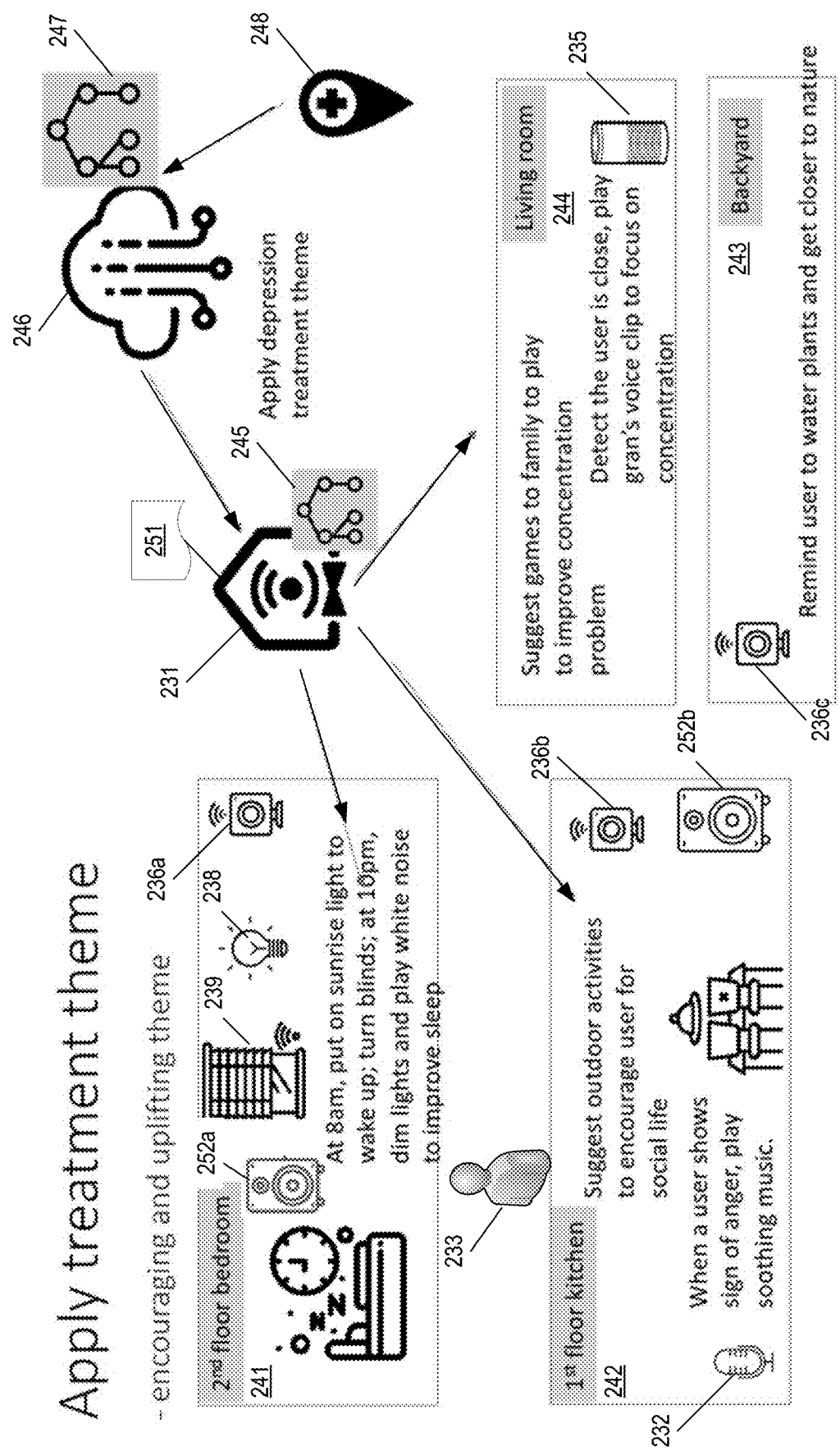
FIG. 2D is a more detailed block diagram illustrating an example, non-limiting embodiment of a system functioning within the communication network 100 of FIG. 1 and adapted for early detection and treatment in healthcare in accordance with various aspects described herein.

FIG. 2D is a more detailed block diagram illustrating an example, non-limiting embodiment of a system 250 functioning within the communication network 100 of FIG. 1 and adapted for early detection and treatment in healthcare in accordance with various aspects described herein. The example system 250 is adapted to apply a theme 251 to one or more environments of a venue 240 of an observed individual 233, responsive to a detected target anomaly and/or a medical condition, and/or change in previously recognized medical condition. In particular, the theme 251 may be adapted to mitigate symptoms of the detected target anomaly and/or a medical condition, and/or change in previously recognized medical condition, in a manner designed to improve a condition of the observed individual 233.

Generally, the theme 251 may include one or more of an adjustment to an environmental condition, e.g., including an application of an environmental condition, a removal of an environmental condition, an adjustment to an existing or current environmental condition and any combination thereof for any combination of environmental conditions. Environmental conditions may include, without limitation, a light intensity, a light color, a light pattern, a light source, a temperature, an airflow, a sound level, a sound source, a sound type, e.g., music, white noise and/or nature sounds and the like. Environmental conditions may further include, without limitation, a visual stimulus, e.g., a displayed screen image, such as a photo, a display background and/or a screen saver, a video and/or multimedia presentation, a communication to the observed individual 233, e.g., a text message, an email, and/or a phone call, e.g., providing an encouraging and/or supportive message, and so on.

According to the illustrative example, the system 250 may be adapted to provide an encouraging and/or uplifting theme within the home venue 240 adapted to mitigate symptoms of and/or otherwise alleviate depression in the observed individual 233. For example, the smart home controller 231 may be adapted to apply a prescribed theme 251 to one or more environments 241, 242, 243, 244 of the home venue, by manipulating and/or otherwise controlling controllable devices. The smart home controller 231 may be adapted to apply a theme to the second floor bedroom environment 241 at a scheduled morning time, say 8:00 am. The smart home controller may cause lighting to be adjusted in the second floor bedroom environment 241, e.g., increasing the lighting to promote wakefulness. In this regard, the smart home controller 231 may cause a light 238 to be turned on and/or a remotely operable window blind or shade 239 to be opened and/or otherwise adjusted. In at least some instances, the smart home controller 231 may cause wakeful sounds and/or music to be played via a first home audio device 252a, e.g., a radio, home assistant, and/or MP3 player, located within the bedroom environment 241. Similarly, at a scheduled evening time, the smart home controller 231 may cause lighting intensity of the bedroom environment 241 to be decreased to promote sleepiness, e.g., by dimming or turning the light 238 off and/or closing and/or otherwise adjusting the remotely operable window blind or shade 239. In at least some instances, the smart home controller 231 may cause soothing, relaxing, or restful sounds, such as white noise, and/or music may be played via the first home audio device 252a to promote, enhance and/or otherwise improve sleep.

The smart home controller 231 may be adapted in a similar manner to apply and/or adjust prescribed environmental themes 251 to one or more other environments within the venue 240. The environmental themes 251 may be applied in isolation, e.g., only to one or more environments of a venue 240. Alternatively or in addition, the environmental themes 251 may be applied in coordination and/or cooperation among multiple environments of a venue 240. Such prescribed environmental themes 251 may be identified and/or otherwise prescribed by a domain expert 248. Professionally prescribed themes may include specific thematic controls that address lighting, sound, temperature, and/or any other controllable stimuli that may be applied to one or more environments of the venue 240 representing the user's home. For example, the thematic controls may indicate dim bedroom lighting at 10 pm. Alternatively or in addition, the prescribed themes may include more general instructions, such as apply calming environmental stimulus and/or sleep conducive stimuli at 10 pm. One or more of the particular devices to control and/or the control selections, such as dimming, sound level, audio selections may be prescribed and/or left up to other elements of the smart home controller 231 to define and/or otherwise implement.

In at least some applications, thematic controls may be applied, e.g., by the smart home controller 231, to adapt themes of one or more environments of an observed individual 233 according to a schedule, e.g., a time of day and/or day of the week. Alternatively or in addition, thematic controls may be applied to adapt themes of one or more environments responsive to an event. Accordingly, such thematic controls may be applied according to a prescribed treatment according to schedules and/or events. For example, a sensor, such as the microphone 232 in the first floor kitchen environment 242 may detect raised voices in the presence of the observed individual 233 previously diagnosed with a condition, such as uncontrollable outbursts of anger or rage. In such instances, the smart home controller 231 may apply thematic controls to one or more environmental conditioning devices in the kitchen environment 242 adapted to manage and/or otherwise control or improve a perceived anger or rage condition of the observed individual 233. Such thematic controls may play soothing music and/or calming messages via a nearby audio device 252b. To the extent sensors detect a depressed mood of the observed individual, thematic controls may provide messages, e.g., via the audio device 252b, to encourage the observed individual 233 to enhance their social activity, e.g., suggesting that then initiate an uplifting activity, such as exercise and/or encouraging they contact a friend or family member.

Still other examples include thematic controls that may suggest games to family to play to improve concentration problems. Alternatively or in addition, responsive to a sensor detecting an observed individual 233 is in a particular environment, such as a living room environment 244 and close to a digital assistant 235, playing a familiar sound, such as a recording of a family member's voice, perhaps the voice of an absent and/or deceased family member. Application of such thematic controls may be initiated, e.g., by the smart home controller 231, at least part responsive to a current and/or prior diagnosis of a condition, including cognitive conditions, such as dementia or Alzheimer's.

In at least some embodiments, a collection of environmental themes may be predetermined, developed and/or tailored over time. Such collections may include generalized categories, such as weeknight sleep theme, weekend wake theme, calming theme, stimulating theme, and so on. Although at least some guidance for application and/or design of a treatment theme may include input and/or prescription from one or more domain expert 248, it is envisioned that in at least some embodiments, such themes may be generated and/or adjusted by the observed individual 233, the local observer 249 and/or determined wholly or at least in part by the smart home controller 231.

It is understood that the system 250 may be adapted to continue obtaining sensory input data from deployed sensors and systems, such as the examples disclosed herein, during and/or after any applications of thematic variations. For example, application of thematic controls adapted to wake an individual may be associated with subsequent sensor data to determine whether the applied thematic scheme induced an intended effect, e.g., waking the individual. Motion sensors and/or cameras may detect activity within the bedroom environment 241 coincident with and/or shortly after an application of a wakefulness environmental theme, which may be correlated to the thematic variation, e.g., by the smart home controller 231. Observed sensor data may be evaluated to determine whether the applied environmental them achieved an intended effect. Evaluation of sensor data that may be correlated to induced environmental changes may be used to evaluate an effectiveness of the applied treatment. Such feedback may be used to reinforce a successfully applied environmental change and/or to induce modifications to the applied environmental changes adapted to achieve the intended effect.

In at least some instances, the sensor data may be evaluated in cooperation with application of a thematic treatment and historical data. The historical data may indicate that the same or similar thematic treatment was applied to the observed individual 233 successfully on one or more prior occasions. To the extent that the sensory data may indicate an earlier successful treatment is no longer achieving intended effect in the observed individual, such information may be included in a summary report prepared by the smart home controller 231 and/or provided directly to the domain expert 248 for further evaluation. For example, a worsening in a previously diagnosed condition may represent a subsequent diagnoses—perhaps a progression to another stage of a disorder, such as Alzheimer's. The subsequent diagnosis may be used to further adjust earlier treatment themes and/or to develop new treatment themes to address such progressions in a condition. Accordingly, the system 250 may apply feedback to improve diagnoses and/or to improve development and/or application of environmental theme treatments. Lessons learned by the system 250 and/or by the domain expert 248 may be applied to the observed individual 233 and/or to other individuals being monitored and/or treated in a similar manner at other venues.

Figure 2E:
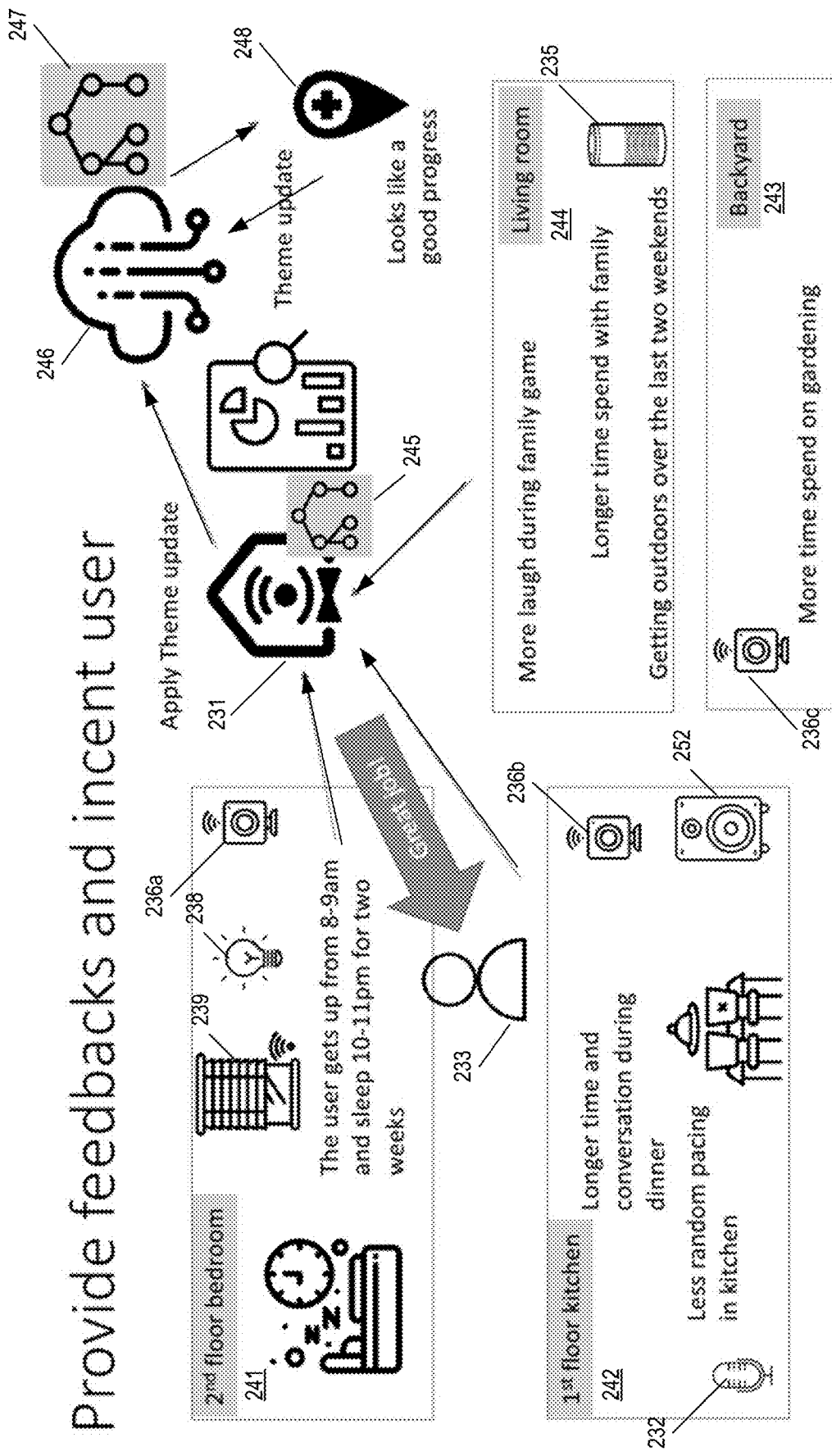
FIG. 2E is a more detailed block diagram illustrating an example, non-limiting embodiment of a system functioning within the communication network 100 of FIG. 1 and adapted for early detection and treatment in healthcare in accordance with various aspects described herein.

FIG. 2E is a more detailed block diagram illustrating an example, non-limiting embodiment of a system 260 functioning within the communication network 100 of FIG. 1 and adapted for early detection and treatment in healthcare in accordance with various aspects described herein. The example system 260 is configured to provide feedback. In at least some embodiments, the feedback is provided to the observed individual 233 for which a condition may have been diagnosed, e.g., according to the example techniques disclosed herein. User feedback may be provided directly and/or indirectly in one or more modes, such as audible messages, environmental rewards, such as permitting access to favored activities, such as access to favorite multimedia programs, games and the like. The feedback may be positive, e.g., intended to encourage the observed individual to continue with a prior or current activity, as the individual is gaining a benefit of the treatment towards the diagnosed condition.

Consider a situation in which an observed individual 233 successfully maintains a prescribed sleep pattern for a predetermined or threshold period of time. Sensors, such as the camera 236a may detect activity suggesting the observed individual 233 has awaken between about 8-9 am and retired to bed between about 10-11 pm for a threshold period of about 2 weeks. If the observed behavior corresponds to a prescribed wake-sleep pattern, the system 260 may provide positive and/or reinforcing feedback to the observed individual 233. Other example activities that may be rewarded in a similar manner may include longer duration conversations during dinner and/or less time pacing within the kitchen environment 242, more laughing during family gameplay, longer time spent with other family members, e.g., as may be observed within the living room environment 244 and/or more time spent outdoors, e.g., tending to a garden in the backyard environment 243 and/or walking as may be detectable by a personal health monitor, such as a smartphone and/or smartwatch.

According to the example, the system 260 provides the observed individual 233 with a corresponding message. The message may be general, e.g., "Great job!" or more specific with respect to a particular activity or behavior, e.g., "Great job on maintain a healthy wake-sleep pattern over the past two weeks!". In at least some embodiments, the reinforcing message may be prompted from feedback provided by a domain expert 248 that may indicate the observed individual 233 is making progress. Such feedback messages may be applied in one or more modes, such as a text message and/or an audible message directed towards the observed individual 233. Alternatively or in addition, the reinforcing message may be provided to another individual to prompt positive social interaction surrounding the monitored activity or behavior. Consider a text message, email and/or voice message provided to a friend, family member or loved one reporting the positive behavior and recommending that they reach out to provide positive reinforcement to the observed individual. In this capacity, the smart home controller 231 may be preconfigured, e.g., during a setup or configuration phase, to identify the observed individual 233, and possibly identities of other individual, such as others residing and/or visiting the venue 240, possibly identifying their relationships to the observed individual 233.

Figure 2F:
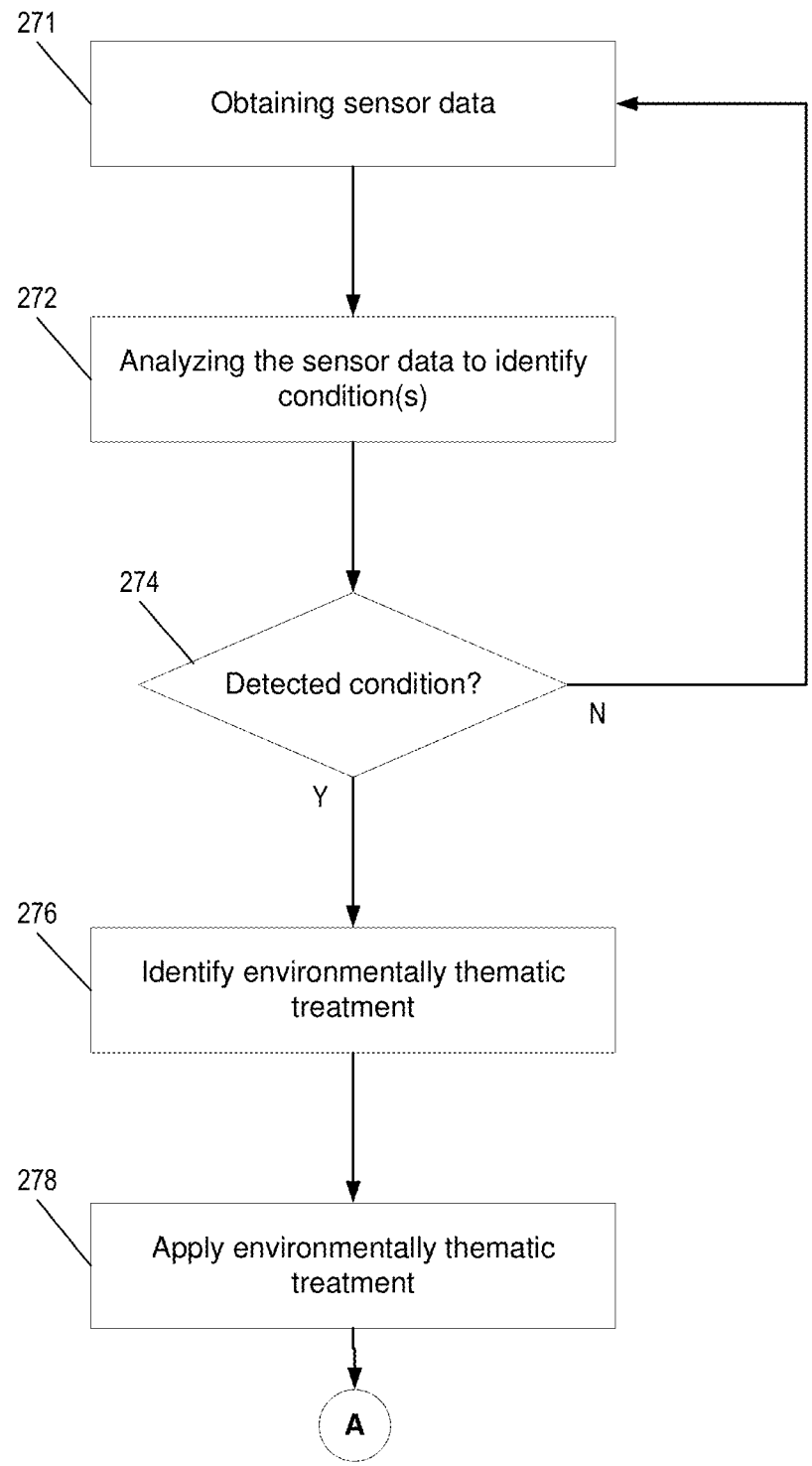
FIG. 2F depicts an illustrative embodiment of a process in accordance with various aspects related to dynamic home themes for assisted early detection and treatment in healthcare described herein.

FIG. 2F depicts an illustrative embodiment of a process 270 in accordance with various aspects related to dynamic home themes for assisted early detection and treatment in healthcare described herein. According to the example process 270, sensor data is obtained at 271. Sensor data may be provided by one or more sensors operating within an observed environment. The sensors may include any of the various sensors disclosed herein or otherwise adapted to obtain sensory information from an environment and/or an individual present within the environment. Sensor day may include raw data obtained from the sensors directly, such as audio, video, temperature. Alternatively or in addition, the sensor data may include processed sensor data, such as an indication whether recorded audio includes dialogue, textual representation of dialogue, facial recognition of recorded images and/or video, and so on.

The sensor data may be provided independently from at least some sensors to a central processing location, e.g., the smart home controller 220, 231 (FIGS. 2B, 2C). Preprocessing, of sensory data may occur at some sensors, e.g., before sensor data and/or preprocessed sensor data is provided to the central processing location. Alternatively or in addition, preprocessing of at least some sensor data may occur at another location separate from the sensor, e.g., at the smart home controller 220, 231.

In at least some embodiments, preprocessing of sensor data includes an indication that a particular individual, e.g., the observed individual 233 (FIG. 2C) is associated with the recorded and/or pre-processed sensor data. For example, in some instances, the environment may record sensor data that may include an image and/or voice of the observed individual. In such instances, the sensor data may be analyzed to recognize the observed individual, e.g., through facial recognition and/or voice recognition. In at least some situations, sensor data may be obtained from an environment occupied by multiple individuals. In such instances, the sensor data may be analyzed to distinguish the observed individual from among a group of individuals. In at least some embodiments, sensor inputs obtained form an environment with a group of individuals may be analyzed to attribute at least some sensor data to the observed individual. For example, facial recognition and/or voice recognition may be applied to recorded images, video and/or audio to identify the observed individual.

It is understood that sensor data obtained from an environment by a first sensor may not be directly attributable to an observed individual. For example, a motion detector may sense motion within a room, without necessarily having an ability to identify a source of the motion, e.g., a pet, an individual, a robotic vacuum. In such instances, sensor data obtained from the environment by a second sensor may be used to identify a probable source of an event or condition recorded within the sensor data, e.g., whether the sensor data may be associated with a pat, a robot, and/or the observed individual. The system 230, 250, 260 (FIGS. 2C, 2D, 2E) may correlate data from both sensors, e.g., according to corresponding sensor data time values. To the extent that the data was obtained coincidentally and/or from the same general area of the observed environment, they may be correlated. Once correlated, the system 230, 250, 260 may associate data from the first sensor with an entity determined via the second sensor. Such associations may be performed at a central processing location, such as the smart home controller 220, 231.

The sensor data is analyzed at 272 to identify a condition. For example, the sensor data may be analyzed to determine one or more of an activity and/or lack of activity, associated times and/or locations, and/or whether the sensor data may be attributable to the observed individual 233. The sensor data, once attributable to the observed individual, may be further analyzed to determine if observed activity and/or lack thereof, may indicate a condition. The analysis may include a multistep process, e.g., whereby sensor data from one room may be associated with activities expected to occur within that room. Examples may include wake-sleep patterns in a bedroom, interpersonal interactions and/or entertainment consumption patterns in a living room, e interpersonal interactions and/or eating patterns in a kitchen, and so on. The sensor data, may be associated with one or more of the expected activities. For example motion detected in a bedroom may be associated with waking of the observed individual.

It is further understood that the analyses may include observations from a single sensor, a single class of sensors, and/or a combination of sensors. Observations from a first sensor may be used to narrow down a possible subset of activities from among a group of expected activities, while sensor data from another sensor may be used to further narrow down an associated activity. For example, a motion detector may detect motion in a bedroom, possibly indicating waking or restless sleep. Sensor data from a light sensor and/or a light on/off indicator may indicate that the lights remained off, in which instances the analysis may conclude restless sleep, whereas sensing that a light was turned on and/or a blind opened, may allow the analysis to conclude waking.

A determination is made at 274 as to whether a condition has been detected. To the extent a condition has not been detected at 274, the process 270 may return to obtaining subsequent sensor data at 271. It is envisioned that in at least some embodiments, at least some sensor data may be monitored continuously. Alternatively or in addition, at least some sensor data may be monitored according to a schedule, e.g., every few seconds, minutes, tens of minutes, hours, days, and so on. In at least some instances, sensor data may be monitored according to an occurrence of an event, such as detection of motion and/or sound.

In at least some embodiments, the condition may be detected automatically, e.g., by the smart home controller 231. For example, the smart home controller may apply sensor data and/or pre-processed sensor data to a suitably trained local AI model 245 (FIGS. 2C, 2D, 2E). The AI model 245 may have been trained using training sets of sensor data to recognize an anomaly in the sensor data indicative of a condition of an observed individual 233. The smart home controller 231 may detect the anomaly, and forward a summary report of the anomaly and/or associated sensor data. The anomaly may be related to one or more conditions, such as depression, anxiety, anger, dementia. The AI model 245 may have been trained using training data sets of sensor data to recognized such conditions, in which instances, a detection of the anomaly may be indicative of a particular condition, or class of conditions. Alternatively or in addition, the sensor data may be provided to a domain expert 248 (FIGS. 2C, 2D, 2E) for an independent analysis with or without evaluation by the AI model 245.

To the extent a condition is detected at 274, the process 270 proceeds to identify environmentally thematic treatment at 276. Such environmental themes may include one or more environmental conditions, such as sounds, sound levels, sound context, e.g., music, dialogue, lighting, light intensity, light color, light patterns, temperature, ventilation, selections of and/or access to images, videos and/or other activities, such as computer gaming, social visits and the like. The environmental themes may be predetermined, e.g., according to one or more of a particular condition, a time of day, day of week, an identity of the individual, e.g., an age, a gender, and/or a name. The predetermined themes may prescribe one or more types of environmental conditions and/or settings of one or more types of environmental conditions. In at least some embodiments, the environmental theme is identified automatically, e.g., by the smart home controller 231, responsive to detection of the condition. Alternatively or in addition, the environmental theme may be identified at least in party by the domain expert 248. Environmental prescriptions from the domain expert may be general, e.g., increase light stimulus during the daylight hours and/or play soothing sounds and/or music. Alternatively or in addition, the environmental thematic prescriptions from the domain expert 248 may be specific, e.g., apply warm lighting of a prescribed color temperature range and intensity range during a prescribed period.

Environmental thematic prescriptions provided by the domain expert 248 may be received by the smart home controller 231. The smart home controller 231, in turn, may generate environmental stimulation instructions or commands adapted to alter a theme of the observed/controlled environment according to the prescription. To the extent that the prescriptions are general, the smart home controller 231 may interpret the general prescription in view of available environmental stimulator(s), and prepare instructions for the available environmental stimulator(s) to adapt a theme of the environment according to the prescription. In at least some instances in which there may be a conflict between a prescribed environmental stimulus and an available environmental stimulator, the smart home controller 231 may automatically request further clarification and/or modification from the domain expert 248. Alternatively or in addition, the smart home controller 231 may automatically identify a substitution for the prescribed stimulus based on available stimulator(s).

The identified environmentally thematic treatment may applied to an environment at 278, e.g., adapting one or more conditions and/or features of the environment based on the prescription.

Figure 2G:
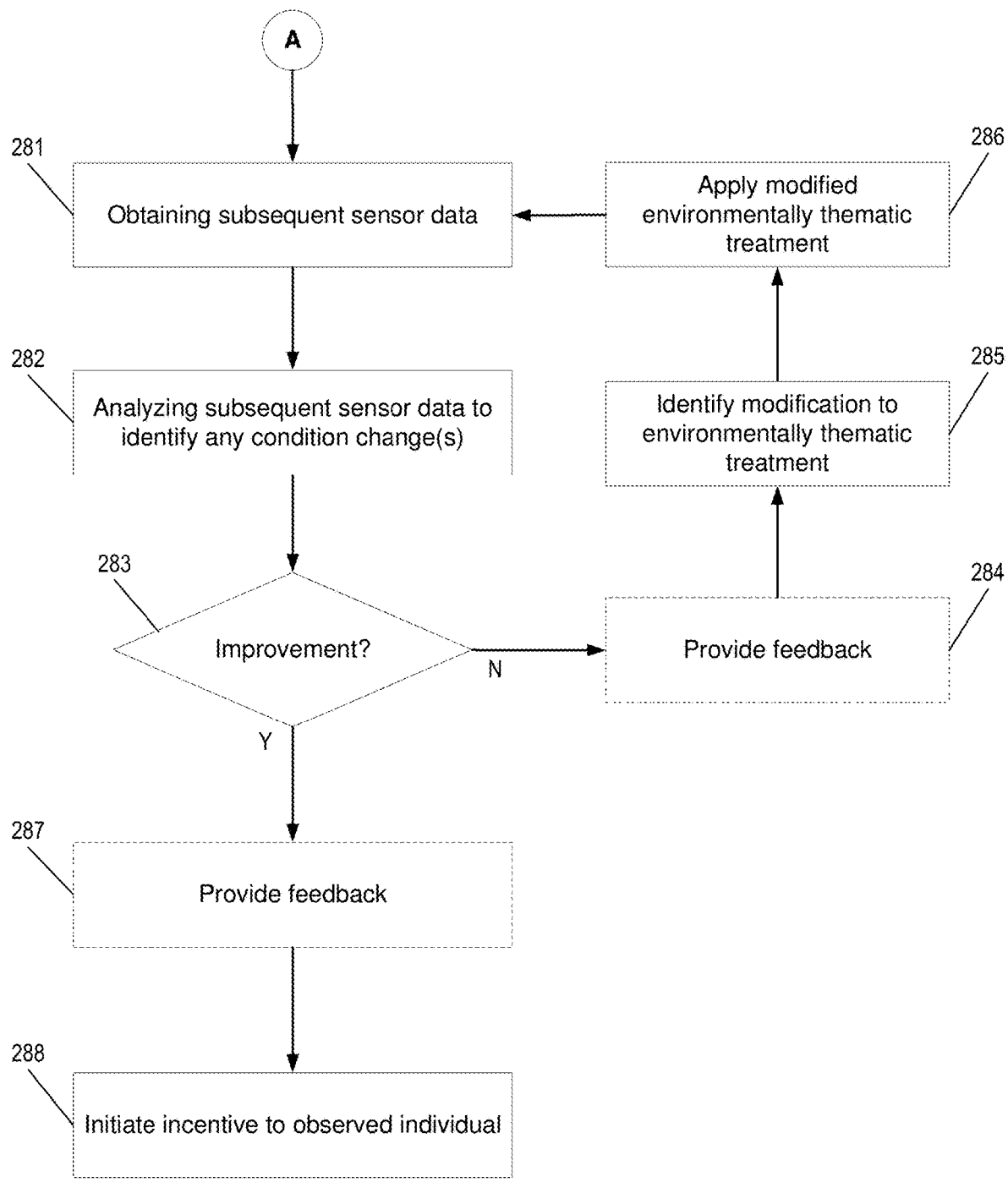
FIG. 2G depicts an illustrative embodiment of a process in accordance with various aspects related to dynamic home themes for assisted early detection and treatment in healthcare described herein.

FIG. 2G depicts an illustrative embodiment of a process 280 in accordance with various aspects related to dynamic home themes for assisted early detection and treatment in healthcare described herein. The example process 280 may continue from "A", e.g., continuing subsequent to application of an environmentally thematic treatment at 278 (FIG. 2F). Subsequent sensor data is obtained at 281, according to any of the various techniques disclosed herein, including continuous monitoring, periodic monitoring, e.g., according to a schedule and/or an occurrence of an event.

The subsequently obtained sensor data is analyzed at 282 to identify any changes to a condition that may have been previously determined at 274 (FIG. 2F). A determination is made at 283 as to whether any condition changes have been detected. To the extent a condition change has been detected at 283, the process 280 may optionally provide feedback at 287 (shown in phantom). Feedback may include one or more of an indication that a condition change was detected, the condition in which a change was detected, an observed individual for which the condition was detected, an indication of whether the change was positive, e.g., suggesting that the environmentally thematic treatment may have been effective in causing the positive change. To the extent the feedback indicates that a change was negative, it may suggest that the environmentally thematic treatment was not effective in improving a detected or diagnosed condition.

To the extent a condition change is not detected at 283, the process 280 may optionally provide feedback at 284 (shown in phantom). The process 280 proceeds to identify a modification to the environmentally thematic treatment at 285. The modifications may be obtained from the domain expert 248. Alternatively or in addition, the modifications may be developed and/or identified locally, e.g., by the smart home controller 231.

The modified environmentally thematic treatment may be applied to the environment at 286. The process 280 may continue to obtain subsequent sensor data at 281, analyze the subsequent data at 282 to identify any conditions changes, determine improvements at 283, and so on.

While for purposes of simplicity of explanation, the respective processes are shown and described as a series of blocks in FIGS. 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communications network 100, the subsystems and functions of systems 200, 210, 230, 250, 260 and processes 270 and 280 presented in FIGS. 1, 2A, 2B, 2C, 2D, 2E, 2F, 2G and 3. For example, virtualized communication network 300 can facilitate in whole or in part obtaining sensor data from a group of sensors arranged within an environment, analyzing the sensor data, detecting a condition of an individual present within the environment according to the analysis, associating a treatment with the condition and applying an environmental theme to the environment according to the treatment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
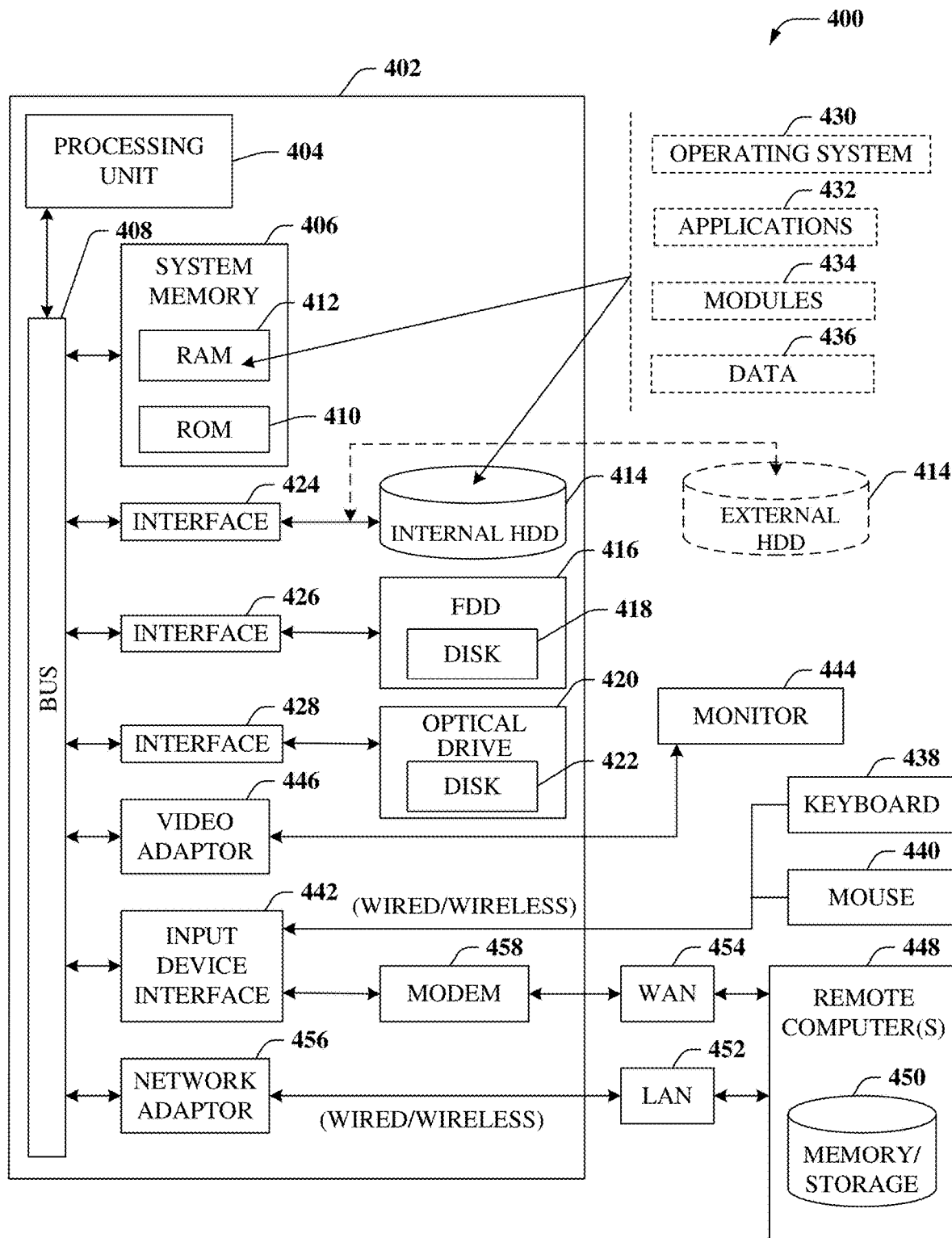
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining sensor data from a group of sensors arranged within an environment, analyzing the sensor data, detecting a condition of an individual present within the environment according to the analysis, associating a treatment with the condition and applying an environmental theme to the environment according to the treatment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
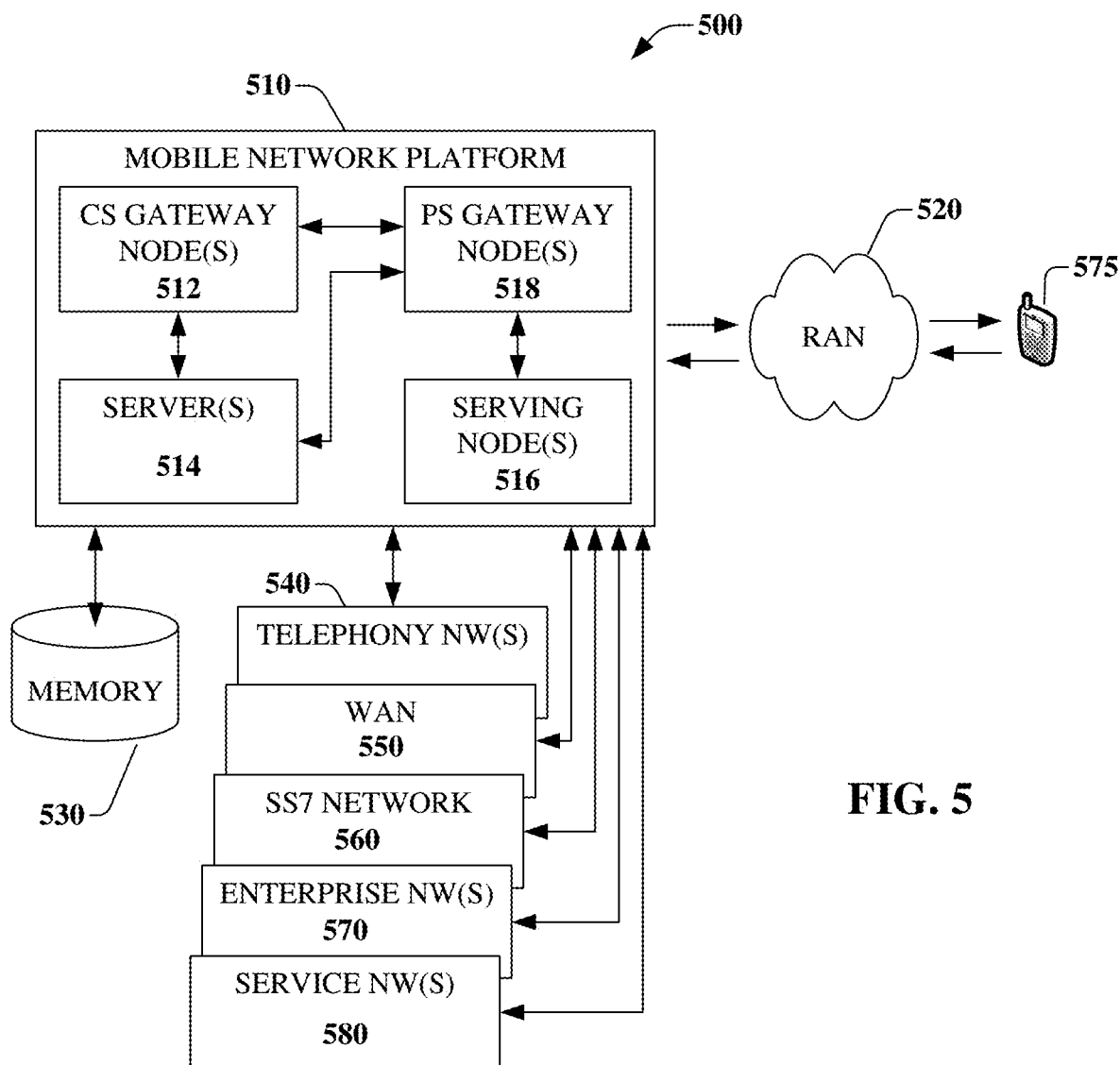
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining sensor data from a group of sensors arranged within an environment, analyzing the sensor data, detecting a condition of an individual present within the environment according to the analysis, associating a treatment with the condition and applying an environmental theme to the environment according to the treatment. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
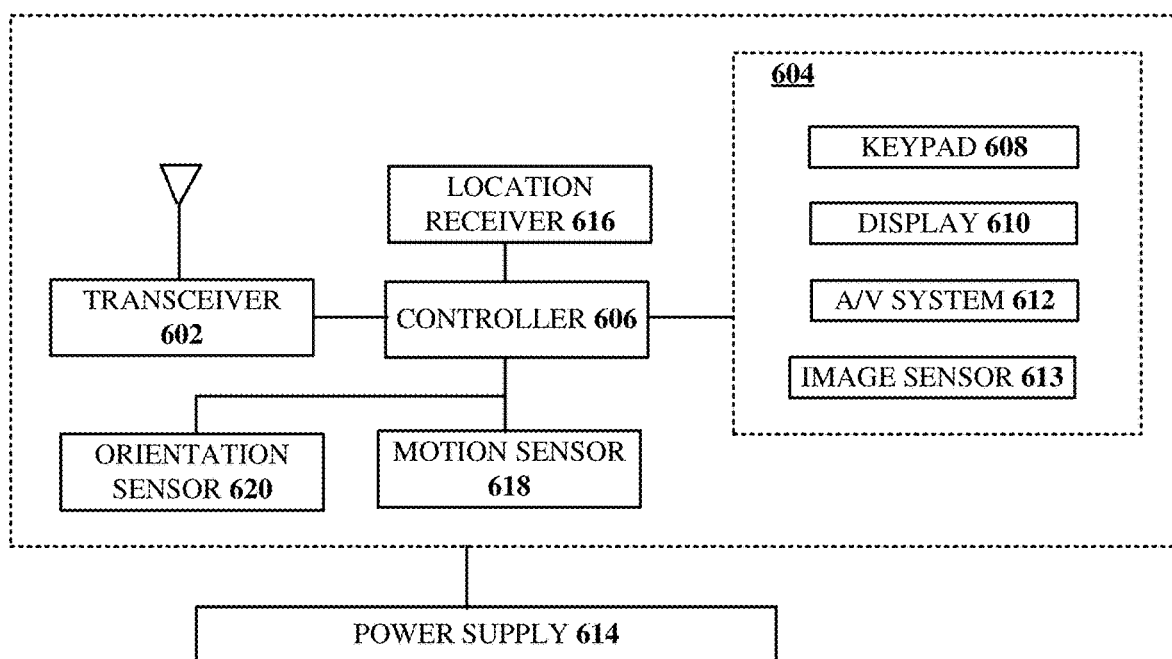
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining sensor data from a group of sensors arranged within an environment, analyzing the sensor data, detecting a condition of an individual present within the environment according to the analysis, associating a treatment with the condition and applying an environmental theme to the environment according to the treatment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The techniques disclosed herein may be offered as a home services adapted to enhance family life, safety for home occupants, and/or ease of handling various, possibly complex, situations. These techniques may be provided as add-ons to smart home manager services, providing business differentiation and enhancing the richness and quality of any provider's service offerings. It is understood that in at least some applications, implementation of the disclosed features are relatively easy to add to existing smart home services, and there could provide incremental added revenue for the service provider.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4 . . . xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving, by a processing system, sensor data from a plurality of sensors arranged within an environment, the sensor data comprising observations of an observed individual, the sensor data being collected continuously to obtain a time series;

analyzing, by the processing system, the sensor data to obtain an analysis result, wherein the analyzing the sensor data comprises evaluating the sensor data according to a trained neural network to obtain the analysis result, and wherein the trained neural network comprises an artificial intelligence (AI) neural network, a machine learning (ML) neural network, or any combination thereof;

identifying, by the processing system, a treatable condition of the observed individual according to the analysis result;

determining, by the processing system, a treatment according to the treatable condition;

controlling, by the processing system based on the treatable condition, a device located within the environment; and actuating, by the processing system, a stimulus based on the treatment, wherein the stimulus is adapted to mitigate symptoms of the treatable condition of the observed individual, and wherein the stimulus comprises (1) a message in a form of a text message, an email, a phone call, or a combination thereof and (2) a change of an environmental condition of the environment, wherein the change is caused by the controlling the device located within the environment.

2. The method of claim 1, wherein the analyzing further comprises detecting, by the processing system, an anomaly in the observations of the observed individual according to the analysis result.

3. The method of claim 1, further comprising:
detecting an anomaly in the observations of the observed individual based on the analysis result, wherein the detecting the treatable condition is based on the anomaly.

4. The method of claim 1, further comprising:
identifying the stimulus according to the treatment.

5. The method of claim 1, wherein the message is an encouraging message, and wherein the stimulus further comprises one of a light, a sound, or a combination thereof.

6. The method of claim 1, wherein the change of the environmental condition comprises a coordinated adjustment of a light, and a sound.

7. The method of claim 1, wherein the identifying the treatable condition further comprises:
forwarding, by the processing system, one of the analysis result, the sensor data, or both to a domain expert; and
obtaining, by the processing system, feedback from the domain expert, wherein the identifying the treatable condition of the observed individual is based on the feedback.

8. The method of claim 1, wherein the analyzing the sensor data further comprises:
applying, by the processing system, machine learning to a neural network to obtain the trained neural network.

9. The method of claim 8, wherein the analyzing the sensor data and the applying the machine learning to the neural network maintain privacy by preventing disclosure of the sensor data outside the environment.

10. The method of claim 1, further comprising:
associating, by the processing system, the sensor data with the observed individual.

11. A system, comprising:
a processing system including a processor; and
a memory that stores executable instructions that, when executed by the processing system, facilitate performance of operations, the operations comprising:
obtaining sensor data from a plurality of sensors arranged within an environment, the sensor data comprising observations of an observed individual, the sensor data being collected continuously to obtain a time series;
analyzing the sensor data to obtain an analysis result, wherein the analyzing the sensor data comprises evaluating the sensor data according to a trained neural network to obtain the analysis result, and wherein the trained neural network comprises an artificial intelligence (AI) neural network, a machine learning (ML) neural network, or any combination thereof;
detecting a condition of the observed individual according to the analysis result to obtain a detected condition;
associating a treatment with the detected condition;
controlling, based on the detected condition, a device located within the environment;
applying a stimulus according to the treatment for the observed individual, wherein the stimulus comprises (1) a message in a form of a text message, an email, a phone call, or a combination thereof and (2) a change of an environmental condition of the environment, wherein the change is caused by the controlling of the device within the environment.

12. The system of claim 11, wherein the operations further comprise:
detecting an anomaly in the observations of the observed individual based on the analysis result, wherein the detecting the condition is based on the anomaly.

13. The system of claim 11, wherein the operations further comprise:
identifying the stimulus according to the treatment.

14. The system of claim 11, wherein the message is a supportive message, and wherein the stimulus further comprises one of a light, a sound, or a combination thereof.

15. The system of claim 11, wherein the change of the environmental condition comprises a coordinated adjustment of a light, and a sound.

16. A non-transitory, machine-readable medium, comprising executable instructions that, when executed by a processing system including a processor, facilitate performance of operations, the operations comprising:
obtaining sensor data from a plurality of sensors arranged within an environment, the sensor data comprising observations of an observed individual, the sensor data being collected continuously to obtain a time series;
analyzing the sensor data to obtain an analysis result, wherein the analyzing the sensor data comprises evaluating the sensor data according to a trained neural network to obtain the analysis result, and wherein the trained neural network comprises an artificial intelligence (AI) neural network, a machine learning (ML) neural network, or any combination thereof;
detecting a condition of the observed individual according to the analysis result;
associating a treatment with the condition;
controlling, based on the condition, a device located within the environment; and
applying a stimulus according to the treatment for the observed individual, wherein the stimulus comprises (1) a message in a form of a text message, an email, a phone call, or a combination thereof and (2) a change of an environmental condition of the environment, wherein the change is caused by the controlling of the device located within the environment.

17. The non-transitory, machine-readable medium of claim 16, wherein the operations further comprise:
identifying an anomaly in the observations of the observed individual based on the analysis result, wherein the detecting the condition is responsive to the anomaly.

18. The non-transitory, machine-readable medium of claim 16, wherein the operations further comprise:
identifying the stimulus according to the treatment.

19. The non-transitory, machine-readable medium of claim 16, wherein the message is a reinforcing message, and wherein the stimulus further comprises one of a light, a sound, or a combination thereof.

20. The non-transitory, machine-readable medium of claim 16, wherein the change of the environmental condition comprises a coordinated adjustment of a light, and a sound.

* * * * *